(12) United States Patent
Sanchez

(10) Patent No.: US 12,313,112 B2
(45) Date of Patent: May 27, 2025

(54) DEVICE FOR ATTACHING A FIRST PART TO A SECOND PART

(71) Applicant: A. RAYMOND ET CIE, Grenoble (FR)

(72) Inventor: Anthony Sanchez, Saint-Martin-le-Vinoux (FR)

(73) Assignee: A. RAYMOND ET CIE, Grenoble (FR)

( * ) Notice: Subject to any disclaimer, the term of this patent is extended or adjusted under 35 U.S.C. 154(b) by 670 days.

(21) Appl. No.: 17/595,027

(22) PCT Filed: May 7, 2020

(86) PCT No.: PCT/FR2020/050757
§ 371 (c)(1),
(2) Date: Nov. 5, 2021

(87) PCT Pub. No.: WO2020/225514
PCT Pub. Date: Nov. 12, 2020

(65) Prior Publication Data
US 2022/0220988 A1      Jul. 14, 2022

(30) Foreign Application Priority Data
May 7, 2019    (FR) .................................... 1904784

(51) Int. Cl.
*F16B 5/06*      (2006.01)
*B60R 13/02*    (2006.01)
(Continued)

(52) U.S. Cl.
CPC .......... *F16B 5/065* (2013.01); *B60R 13/0206* (2013.01); *F16B 2/06* (2013.01); *F16B 21/073* (2013.01)

(58) Field of Classification Search
CPC ... B60J 5/0468; B60J 5/0469; B60R 13/0206; B60R 13/0243; F16B 5/065;
(Continued)

(56) References Cited

U.S. PATENT DOCUMENTS 4,181,154 A    1/1980   Oley et al.
4,237,931 A    12/1980  Rafaely
(Continued)

FOREIGN PATENT DOCUMENTS

DE            4111374 A1 * 10/1991   .............. F16B 5/065
DE       102013020231 A1    6/2015
(Continued)

OTHER PUBLICATIONS

Japanese Official Notice of Rejection for Application No. 2021-565911 dated Apr. 16, 2024, 5 pages.
(Continued)

*Primary Examiner* — Josh Skroupa
(74) *Attorney, Agent, or Firm* — TraskBritt

(57) ABSTRACT

A male element for a device for attaching a first part to a second part, a male element comprising: a flange for retaining the second part; a pin intended to be axially inserted into a cavity of a female element attached to the first part, a foot being provided with a male assembly member intended to axially hold the pin in the female element, the body having a groove. The flange has: an axial opening for receiving the pin and enabling the flange to be moved axially on the pin from a first position to a second position; a retaining member configured to resiliently engage in the groove and hold the flange on the pin in the first position; and a radial rib abutting against the head when the flange is in the second position.

20 Claims, 7 Drawing Sheets

(51) Int. Cl.
*F16B 2/06* (2006.01)
*F16B 21/07* (2006.01)

(58) Field of Classification Search
CPC .... F16B 5/0657; F16B 5/0664; F16B 21/073; F16B 21/16; F16B 21/18; F16B 21/186; Y10T 24/309; Y10T 24/45754; Y10T 403/7015
USPC .................................. 24/297, 658; 403/353
See application file for complete search history.

(56) References Cited

U.S. PATENT DOCUMENTS

| | | | |
|---|---|---|---|
| 4,259,985 A | 4/1981 | Bergmann | |
| 4,766,933 A | 8/1988 | Champseix et al. | |
| 4,840,523 A | 6/1989 | Oshida | |
| 4,979,366 A | 12/1990 | Compton et al. | |
| 5,387,065 A * | 2/1995 | Sullivan | F16B 19/1081 411/48 |
| 5,407,134 A | 4/1995 | Thompson et al. | |
| 5,451,082 A * | 9/1995 | Murai | E05B 65/523 24/658 |
| 5,676,405 A | 10/1997 | Reed | |
| 6,026,860 A | 2/2000 | Teichmann | |
| 6,951,223 B2 | 10/2005 | Fukushima | |
| 7,237,995 B2 * | 7/2007 | Randez Perez | F16B 5/065 403/408.1 |
| 7,257,867 B2 * | 8/2007 | Mizukoshi | F16B 21/073 24/297 |
| 10,443,643 B2 * | 10/2019 | De Marco | F16B 5/0657 |
| 2007/0221273 A1 | 9/2007 | Landers | |
| 2008/0145186 A1 * | 6/2008 | Jin | F16B 5/065 411/480 |
| 2018/0180083 A1 | 6/2018 | Albaran et al. | |

FOREIGN PATENT DOCUMENTS

| | | | |
|---|---|---|---|
| EP | 0250298 A1 | 12/1987 | |
| EP | 1063432 B1 | 11/2002 | |
| EP | 3357759 B1 | 8/2021 | |
| FR | 2359311 A1 * | 2/1978 | ............ F16B 21/073 |
| FR | 3038019 B1 | 6/2017 | |
| GB | 2364973 B | 8/2002 | |
| JP | 60-049283 A | 3/1985 | |
| JP | 61-166212 | 7/1986 | |
| JP | 63-303278 A | 12/1988 | |
| JP | 2010-038185 | 2/2010 | |
| JP | 2011-089538 | 5/2011 | |
| WO | 2018/188823 A1 | 10/2018 | |
| WO | 2019/029915 A1 | 2/2019 | |

OTHER PUBLICATIONS

International Search Report for International Application No. PCT/FR2020/050757 dated Sep. 15, 2020, 2 pages.
International Written Opinion for International Application No. PCT/FR2020/050757 dated Sep. 15, 2020, 6 pages.

* cited by examiner

DEVICE FOR ATTACHING A FIRST PART TO A SECOND PART

CROSS-REFERENCE TO RELATED APPLICATIONS

This application is a national phase entry under 35 U.S.C. § 371 of International Patent Application PCT/FR2020/050757, filed May 7, 2020, designating the United States of America and published as International Patent Publication WO 2020/225514 A1 on Nov. 12, 2020, which claims the benefit under Article 8 of the Patent Cooperation Treaty to French Patent Application Serial No. 1904784, filed May 7, 2019.

TECHNICAL FIELD

The present disclosure relates to an attachment device for assembling two parts together. The disclosure relates more particularly to an attachment device for assembling a first part, for example, a trim panel of a motor vehicle door, to a second part, for example, an inner wall of the vehicle door.

BACKGROUND

In the automotive industry, a door trim panel, or lining, mounted on an inner door wall of a motor vehicle, must have attachment means allowing it to be properly held on the inner door wall not only during normal use, but also in the event of a side impact. The attachment device must, in particular, make it possible to prevent the door trim panel from being able to separate from the metal sheet of the door wall under the effect of the impact and from being dangerously expelled into the passenger compartment of the vehicle, in particular, when it is located on the deployment path of an airbag.

Such an attachment device is known from document FR 3,038,019. This device comprises a female element intended to be attached to the inner door wall and comprising a female assembly member, as well as a male element comprising a flange for retaining the trim panel and a pin intended to engage via a male joint member in the female joint member to hold the pin to the female element.

During normal use, the trim panel is held assembled to the door side wall by means of the female assembly member, which grips the pin and is in abutment against the male assembly member.

In the event of a side impact, a pull-out force is exerted between the trim panel and the door, violently separating them from one another. This force has repercussions on the assembly members, which can be damaged. If the impact is particularly severe, the attachment device may break under stress.

In addition, this attachment device does not in itself include an attachment function. This makes it necessary to provide other attachment means complementary to this device in order to attach the covering panel to the inner door wall, which makes the system more expensive and more complex to use.

Document EP 3,357,759 describes an attachment device designed to damp the repercussion of the impact at the assembly members. To this end, the pin has a collar with inclined blanks, delimiting two spaces and constituting a clipping zone through the flexible jaws of the female assembly member. In normal use, the jaws grip the pin at the first space, the furthest from the male assembly member of the pin. Following a side impact, the pin is pulled away from the female element and the inclined edge of the collar is thrown against the jaws. Due to their flexibility, they relax slightly to let it pass, then close again to come into abutment against the male assembly member of the pin.

However, this solution does not appear to be satisfactory. On the one hand, in normal use, the retention between the male element and the female element, provided by the sole contact between the jaws and the inclined edge of the collar, is not optimal. On the other hand, during an impact, there is a risk that the jaws do not close quickly enough after allowing the collar to pass, and then cannot come into abutment against the male assembly member of the pin. The consequence is then a release of the male element relative to the female element, and a detachment of the attachment device, which is dangerous for the user.

BRIEF SUMMARY

The present disclosure aims to overcome at least some of the aforementioned drawbacks of the state of the art, by proposing an alternative attachment device to the aforementioned state of the art, which allows both a good attachment of the male element to the female element, and a damping of the pull-out force exerted on the device in the event of an impact.

To do this, the present disclosure provides a male element of a device for attaching a first part to a second part, the male element comprising:
 a flange for retaining the second part;
 a pin having a foot, a body and a head, the pin being intended to be axially inserted by the foot into a cavity of a female element attached to the first part, the foot being provided with a male assembly member intended to axially hold the pin in the female element, the body having a groove.

The male element is remarkable in that the flange has:
 an axial opening for receiving the pin and enabling the flange to be moved axially on the pin from a first position to a second position in response to a pull-out force applied to the first or second part;
 a retaining member configured to resiliently engage in the groove and hold the flange on the pin in the first position; and
 a radial rib inside the opening, the radial rib abutting against the head of the pin when the flange is in the second position.

According to other advantageous and non-limiting features of the disclosure, taken alone or in any technically feasible combination:
 the retaining member comprises at least one flexible tab;
 the flexible tab is provided with a lug intended to engage resiliently in the groove when the flange is in the first position;
 the body is provided with a collar in which the groove is formed;
 the blank of the collar located opposite the head of the pin has a chamfered shape to facilitate movement of the retaining member from the second position to the first position;
 the body has a second groove located between the groove and the head;
 the retaining member is also configured to engage resiliently in the second groove and hold the flange on the pin in the second position;
 the pin comprises a base intended to abut against the female element when the male element is held in the female element;

the pin comprises at least one axial rib extending axially along the body;

the axial rib has a first end and a second end, the first end being in contact with the head of the pin, the second end being opposite the foot so that the second end abuts against the female element when the male element is held in the female element;

the retaining member comprises at least two flexible tabs separated from one another by a radial width to receive the axial rib and to guide the axial displacement of the flange on the pin and prevent its axial rotation;

the pin comprises three axial ribs uniformly distributed around the body and in which the retaining member comprises three flexible tabs separated from one another by a radial width to respectively receive the axial ribs; and the flange comprises a compression collar intended to be in contact with the female element when the flange is in the first position.

Another object of the disclosure relates to an attachment device comprising a male element in accordance with what has been explained above and a female element intended to be attached to the first part, the female element having an axial cavity and a female assembly member, the female member being configured to mate with the male assembly member.

The present disclosure also relates to a use of an attachment device according to what has been explained above in which the first part is an inner metal sheet of a motor vehicle door and the second part is an inner trim panel of a motor vehicle door.

BRIEF DESCRIPTION OF THE DRAWINGS

Other advantages and particularities of the disclosure will become apparent on reading the detailed description of implementations and embodiments, which are in no way limiting, with regard to the appended drawings, in which.

DETAILED DESCRIPTION

For the sake of simplifying the following description, the same reference signs are used for elements which are identical or perform the same function in the different embodiments of the disclosure.

In general, the disclosure relates to a male element of a device for attaching a first part, such as an inner metal sheet of a motor vehicle door, to a second part, for example, an inner trim panel of a motor vehicle door. However, the disclosure is not limited to such applications, and the first part can also, for example, be a window lip mechanism, while the second part can be a motor vehicle door window.

General Description of the Attachment Device

Figure 1A:
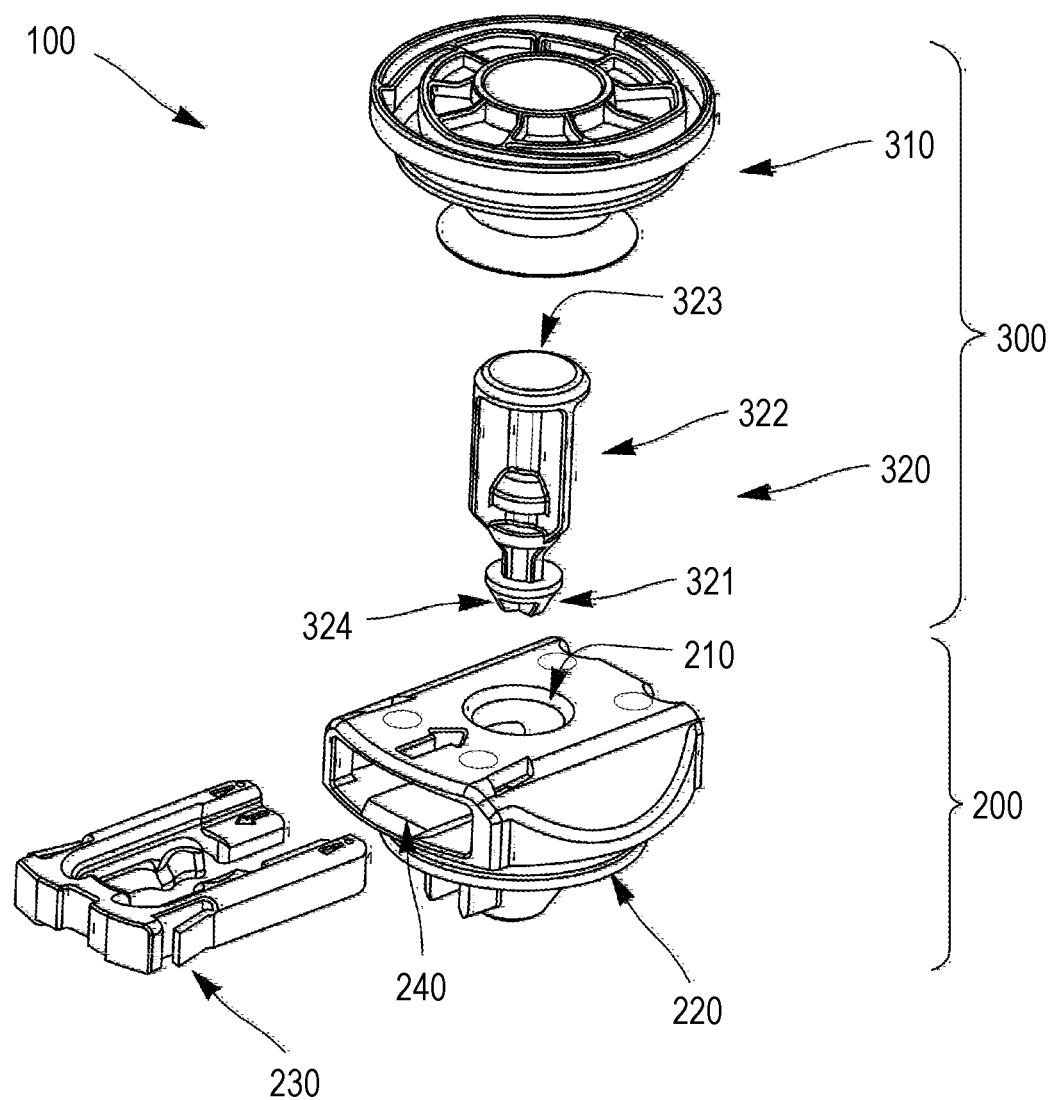
FIG. 1A shows an exploded perspective view of an attachment device according to a first embodiment of a male element according to the disclosure.
Figure 1B:
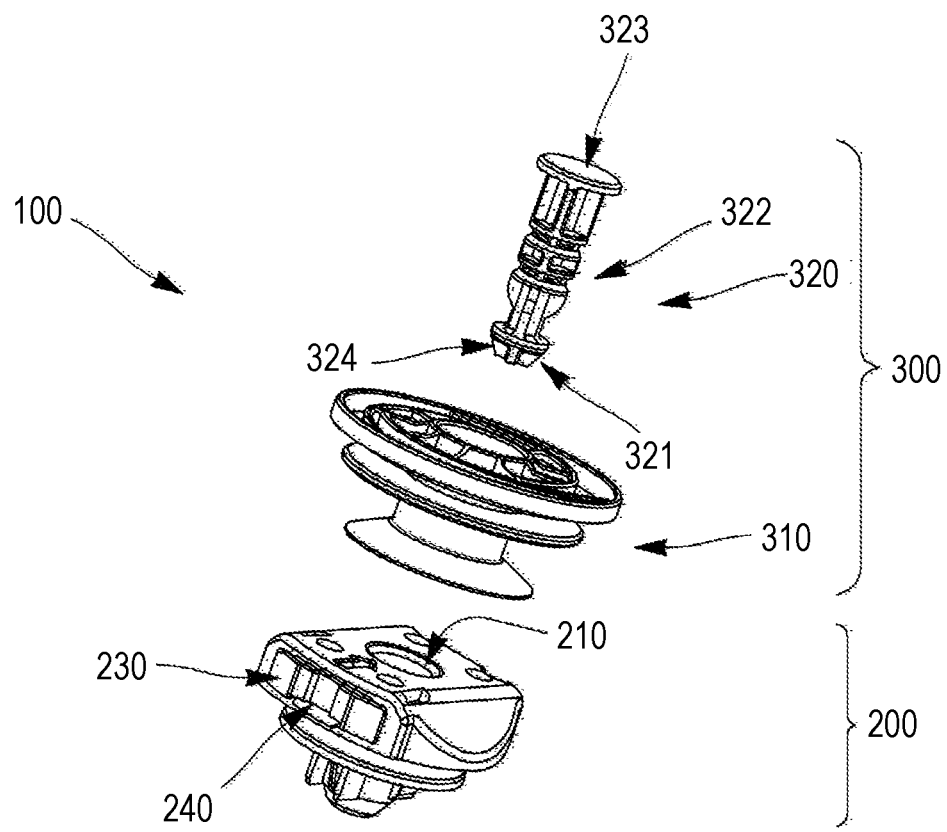
FIG. 1B shows an exploded perspective view of an attachment device according to a second embodiment of a male element according to the disclosure.

FIGS. 1A and 1B show an exploded perspective view of an attachment device 100 according to the present disclosure, according to two embodiments. The specifics of each of the embodiments will be described later.

In general, such an attachment device 100 comprises a female element 200, here a hollow clip having a cylindrical axial cavity 210. The female element 200 is intended to be attached on the first part, that is to say, it comprises means 220 for being brought into engagement with the first part. These means may be of any nature that is well known per se, such as a plate-spacer-against-plate assembly 220, the metal sheet previously pierced with a suitable orifice that can be inserted at the spacer. Advantageously, these means are retractable to allow the separation of the trim panel and the door.

The female element 200 also comprises a female assembly member 230.

In the present description, the term "female assembly member" denotes an assembly member associated with the female element. This assembly member can effectively be a female component, that is to say, intended to receive a male component by penetration, such as the male assembly member that will be described below. However, it may just as well be a male component, able to cooperate with a female component. Likewise, the male assembly member described below is only understood as the assembly member associated with a male element.

According to a particular configuration, the female assembly member 230 is a removable U-shaped jumper, able to be inserted into a radial housing 240 of the female element 200. A particularly advantageous structure of such a female assembly member, as well as the effects associated with such a structure, are fully described in document FR 3,038,019, and will not be presented in more detail here.

Of course, the disclosure is in no way limited to such a configuration of a female assembly member, which can be any assembly member capable of cooperating with a complementary assembly member.

Returning to the description of FIGS. 1A and 1B, the attachment device 100 also comprises a male element 300 comprising a flange 310, intended to retain the second part, and a pin 320.

Figure 2A:
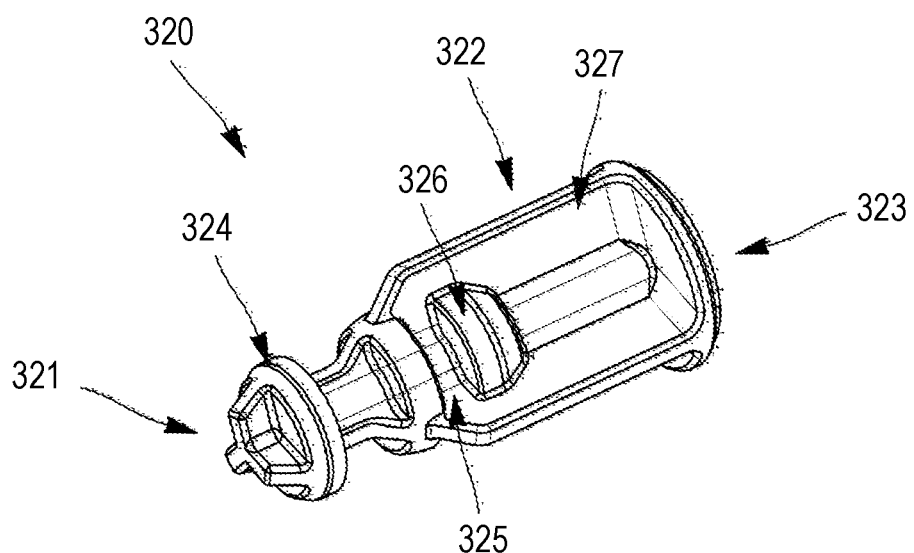
FIG. 2A shows an overall perspective view of a pin according to a first embodiment of a male element according to the disclosure.
Figure 2B:
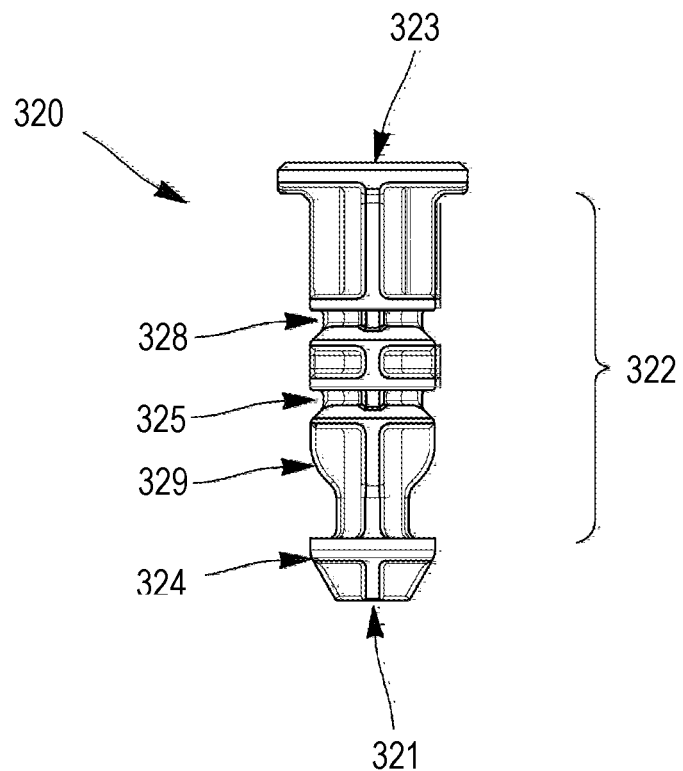
FIG. 2B shows an overall side view of a pin according to a second embodiment of a male element according to the disclosure.

FIGS. 2A and 2B show an overall side view of a pin 320 according to the present disclosure, according to two embodiments.

In general, such a pin 320 has a foot 321, a body 322 and a head 323. The head 323, which is substantially perpendicular to the body 322 of the pin 320, has a larger section than the body 322.

The pin 320 is intended to be inserted axially by the foot 321 into the cavity 210 of the female element 200 in order to assemble the male element 300 to the female element 200.

To this end, the foot 321 is provided with a male assembly member 324 configured to be assembled with the female assembly member 230, for example, by engaging resiliently in the female assembly member 230, and axially holding the pin 320 in the female element 200.

In a particular configuration, as shown in FIGS. 1A, 1B, 2A and 2B, the male assembly member 324 consists of an ogive-shaped tip, configured to fit into the U of the female assembly member 230. Preferably, the shoulder formed by the ogive-shaped tip with respect to the body 322 of the pin 320 is at right angles, in order to maximize the pull-out strength of the pin 320 in the event of an impact exerted on the first or the second part.

Of course, and as has been specified previously, the male assembly member 324 is not limited to such a configuration, and can be any assembly member capable of cooperating with the female assembly member 230. It can equally well be a male component or a female component.

The body 322 of the pin 320 has a groove 325. Advantageously, and as shown in FIG. 2A, the edge of the groove 325 closest to the foot 321 of the pin 320 is perpendicular to the body 322, in order to ensure that the pin 320 cannot be lost. The edge of the groove 325 closest to the head 323 can for its part be perpendicular to the body 322, or form an obtuse angle with respect to the bottom of the groove 325, in order to manage the pull-out force of the second part. These two characteristics will be explained in more detail in the remainder of the present description.

Figure 3:
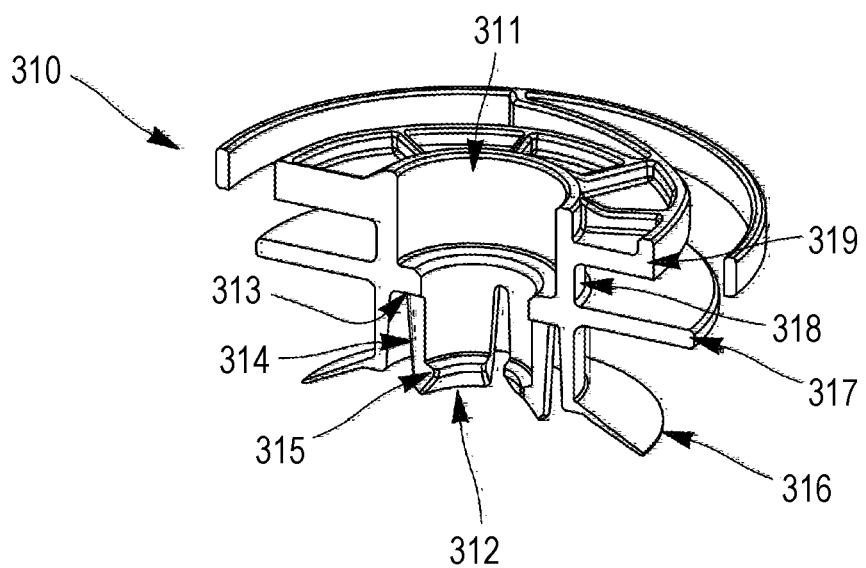
FIG. 3 shows a sectional view of a flange according to the disclosure.

FIG. 3 shows a sectional view of a flange 310 according to the present disclosure.

As can be seen in FIG. 3, the flange 310 comprises means for retaining the second part. As for the female element 200, these means may be of any nature that is well known per se, and may comprise a plate 317, a spacer 318 and a counterplate 319, the trim panel previously pierced with a suitable orifice that can be inserted at the spacer 318. These means can also be retractable to allow the separation of the trim panel and the door.

Whatever the means for retaining the second part, the flange 310 also has an axial opening 311 to receive the pin 320 by its foot 321. The opening 311 is also configured to enable the flange 310 to be moved axially on the pin 320 from a first position to a second position in response to a pull-out force applied to the first or the second part.

Figure 4A:
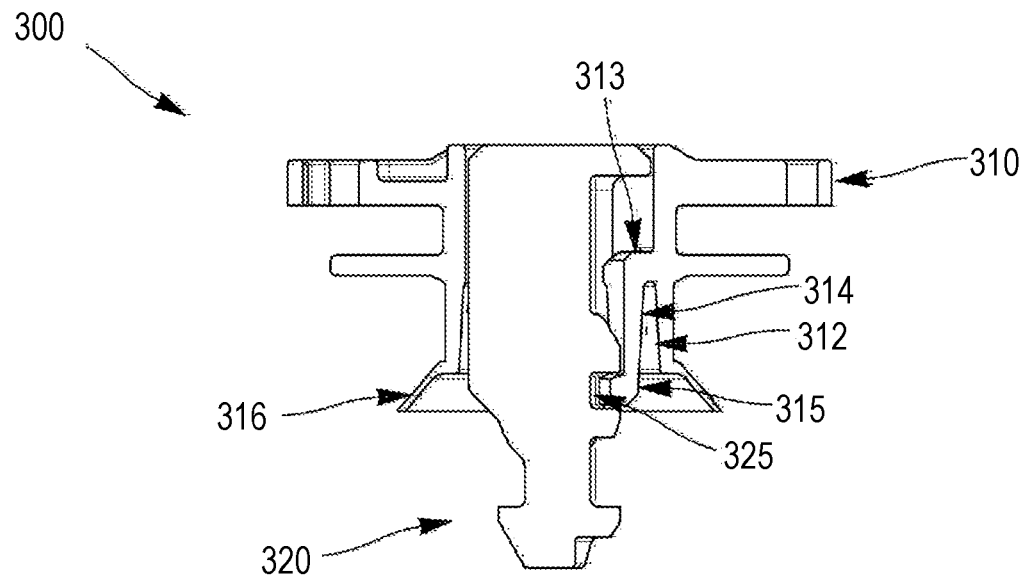
FIG. 4A shows a sectional view of a male assembly according to a first embodiment according to the disclosure in the first position.
Figure 4B:
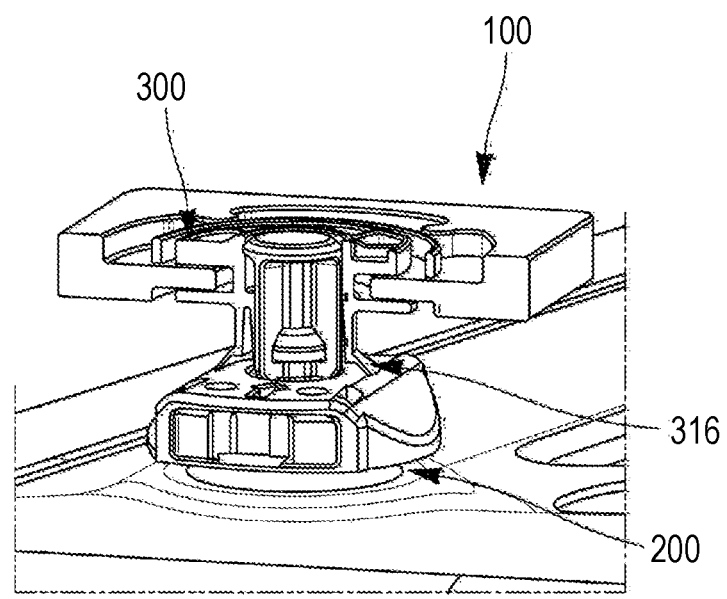
FIG. 4B shows an overall view of an attachment device according to a first embodiment of a male element according to the disclosure in the first position.
Figure 6A:
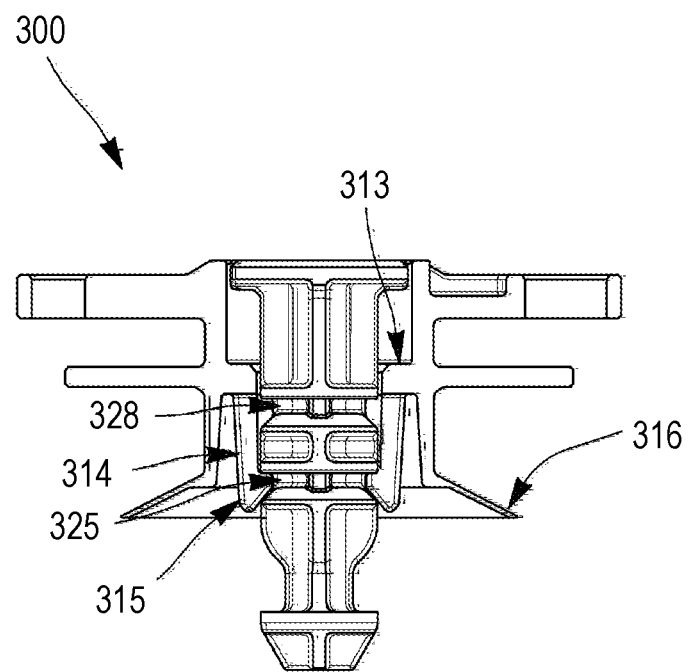
FIG. 6A shows a sectional view of a male assembly according to a second embodiment according to the disclosure in the first position.
Figure 6B:
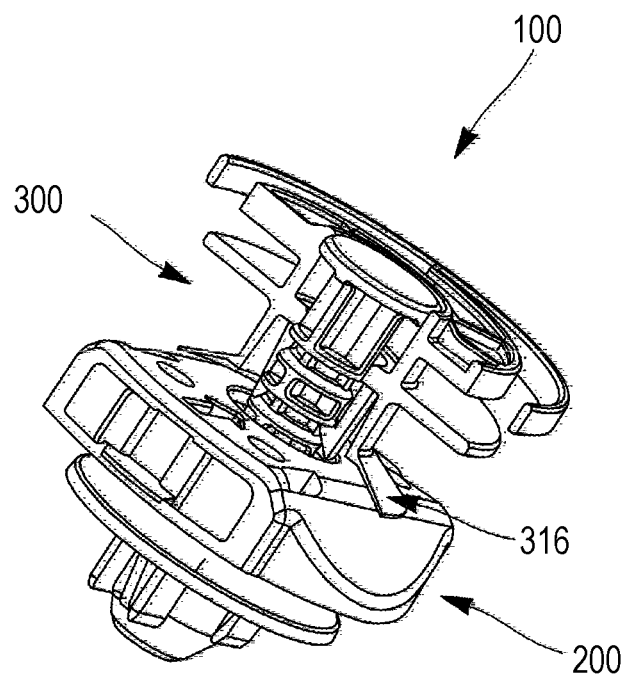
FIG. 6B shows an overall view of an attachment device according to a second embodiment of a male element according to the disclosure in the first position.

FIGS. 4A and 4B respectively show a cross-sectional view of a male assembly 300 and an overall view of an attachment device 100 according to the present disclosure in the first position. These figures show an attachment device 100 according to a first embodiment of a male element 300. FIGS. 6A and 6B respectively show the same views as FIGS. 4A and 4B, for a second embodiment of a male element 300.

Figure 5A:
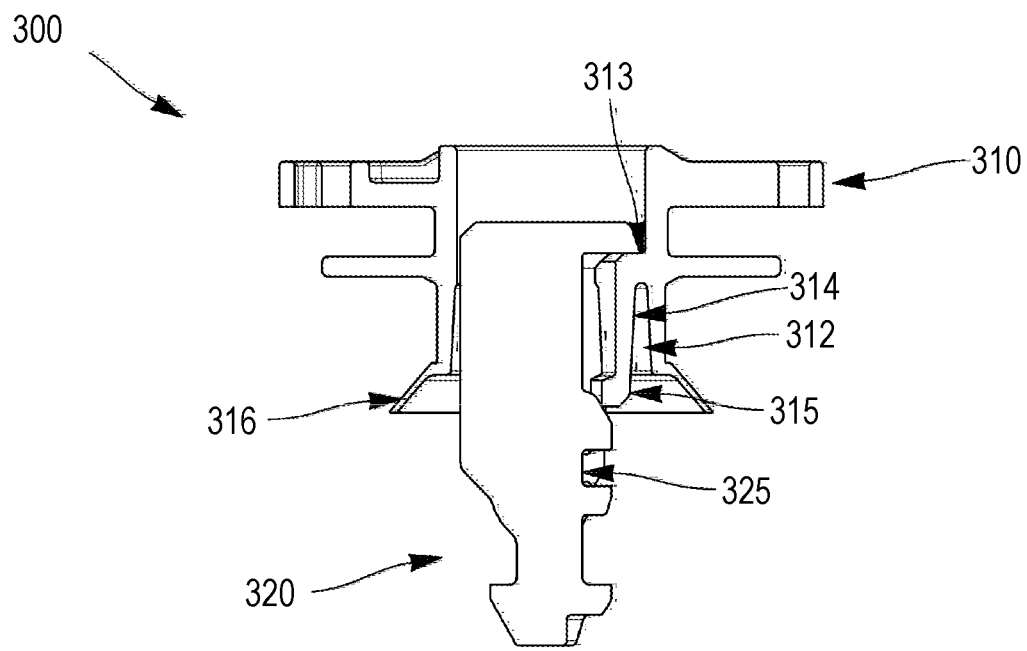
FIG. 5A shows a sectional view of a male assembly according to a first embodiment according to the disclosure in the second position.
Figure 5B:
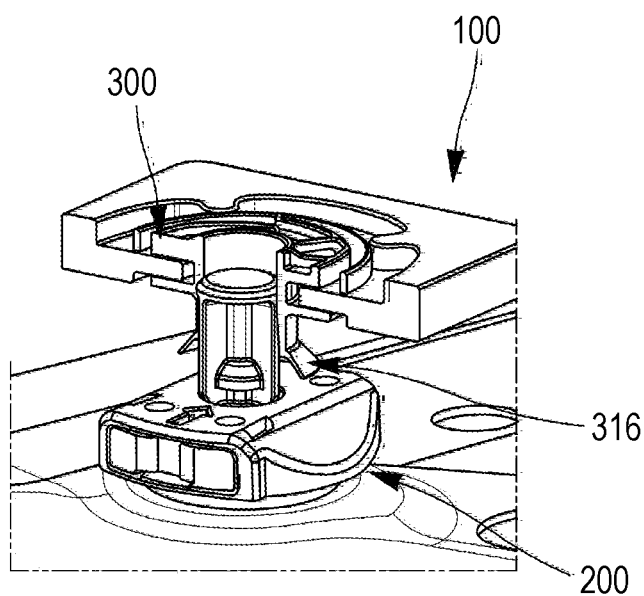
FIG. 5B shows an overall view of an attachment device according to a first embodiment of a male element according to the disclosure in the second position.
Figure 7A:
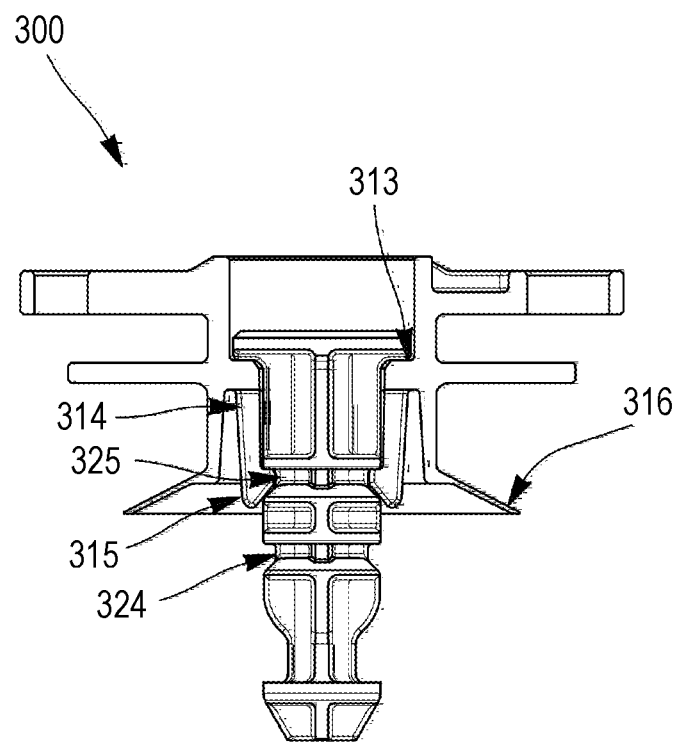
FIG. 7A shows a sectional view of a male assembly according to a second embodiment according to the disclosure in the second position.
Figure 7B:
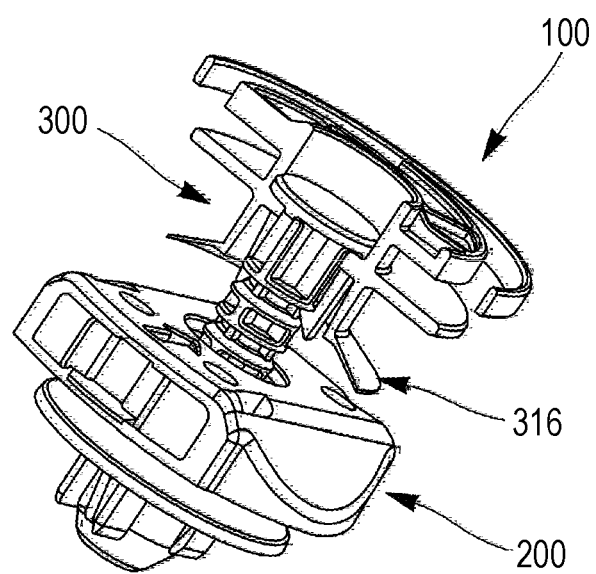
FIG. 7B shows an overall view of an attachment device according to a second embodiment of a male element according to the disclosure in the second position.

Likewise, FIGS. 5A and 5B respectively show a cross-sectional view of a male assembly 300 and an overall view of an attachment device 100 according to the present disclosure in the second position. These figures show an attachment device 100 according to a first embodiment of a male element 300. FIGS. 7A and 7B respectively show the same views as FIGS. 5A and 5B, for a second embodiment of a male element 300.

As shown in FIGS. 4A and 4B, the first position is the position in which the flange 310 is as close as possible, preferably in contact at one of its ends 316 with the female element 200.

Advantageously, the end 316 of the flange 310 is a compression collar 316 intended to be in contact with the female element 200 when the flange is in the first position. Such a compression collar 316 makes it possible to absorb sound waves, vibrations or jolts propagating through the first or the second part in order to reduce noise and improve vibratory and acoustic comfort (generally referred to by the acronym NVH for "Noise, Vibration and Harshness").

As shown in FIGS. 5A and 5B, the second position is a position in which the flange 310 is further from the female element 200 than in the first position.

The possibility granted by the disclosure to the flange 310 to move from the first to the second position during an impact makes it possible to partially absorb the pull-out force exerted on the female element 200 carrying the first part and the flange 310 carrying the second part during the impact.

Thus, the force exerted at the contact between the two assembly members is attenuated compared to the device known from the state of the art, in which the male element is entirely fixed relative to the female element. At the same time, since this point of contact remains fixed, it is more solid than in the case of the device known from the state of the art, in which the pin moves relative to the female element in the event of an impact. To put it another way, an attachment device according to the present disclosure makes it possible to guarantee a solid hold between the first part and the second part while allowing a slight play between the two parts in order to absorb an impact.

To this end, the flange comprises a retaining member 312 configured to resiliently engage in the groove 325 and to hold the flange 310 on the pin 320 in the first position.

As shown in FIGS. 3, 4A, 4B, 6A, and 6B, the retaining member 312 may be located inside the opening 311 and may comprise at least one flexible tab 314. The flexible tab 314 may be provided with a lug 315 intended to engage resiliently in the groove 325 when the flange 310 is in the first position.

In order to better hold the flange 310 on the pin 320, the retaining member 312 may comprise a plurality of flexible tabs 314, for example, two, three or four flexible tabs.

In order to reinforce the previously mentioned effects, the lugs 315 preferably have a shape complementary to that of the previously described groove 325, that is to say, one end forming a right angle with respect to the flexible tab 314, and a base slightly inclined relative to the flexible tab 314.

Thus, when the pin 320 is inserted by the foot 321 inside the opening 311 for the assembly of the male element 300, the shape of the male assembly member 324, in particular, its ogive shape, allows the flexible tabs 314 to be pressed against the walls of the opening 311, without the lugs 315 opposing the movement.

The pin 320 can be inserted effortlessly up to the first position, where the retaining member 312 resiliently engages in the groove 325.

In this position, the advantageous shapes described above for the edge of the groove 325 closest to the foot 321 and to the end of the lug 315 allow the lug 315 to be in abutment against the edge of the groove, preventing the pin 320 from returning to the rear with respect to the flange 310, and thus making it possible to ensure that the pin 320 cannot be lost.

In the event of an impact, the pull-out force exerted on the flange 310 can lead to extracting the lug 315 from the groove 325 and moving the flange 310 away from the female element 200. However, the abutment of the lug 315 in the groove 325 makes it possible to transfer part of the force undergone by the flange 310 at this point of contact, correspondingly reducing the force exerted at the assembly members 324, 230.

To prevent the flange 310 from being pulled out from the pin 320 upon impact, the flange 310 also comprises a radial rib 313 inside the opening 311.

The radial rib 313 may be annular in shape and extend all the way inside the opening 311. Alternatively, the rib 313 may extend only over a portion only of the opening 311. The rib 313 can also consist of a succession of projecting portions in a radial plane.

Whatever the shape of the rib 313, it is situated to come into abutment against the head 323 of the pin 320 when the flange 310 is in the second position.

To put it another way, upon impact, the flange 310 moves away from the female element 200 until the rib 313 abuts against the head 323 of the pin 320.

This second position makes it possible to guarantee the solid attachment of the flange 310 to the pin 320 to avoid its separation, while distributing the pull-out forces between the points of contact located between the two assembly members and between the rib 313 and the head 323 of the pin 320.

Two embodiments of a male element 300 in accordance with the disclosure will now be described successively.

First Embodiment of the Male Element

A first embodiment of a male element according to the present disclosure is shown in FIGS. 1A, 2A, 4A, 4B, 5A, and 5B.

As can be seen, in particular, in FIG. 2A, the male element 300 can advantageously comprise a collar 326 in which the groove 325 is formed.

The presence, and especially the choice of shape, of the collar 326 makes it possible to manage the insertion force of the pin 320 into the flange 310 and of the passage of the latter from one position to another.

Advantageously, the blank of the collar 326 located opposite the head 323 of the pin 320 has a chamfered shape to facilitate movement of the retaining member 312 of the flange 310 from the second position to the first position. To put it another way, due to this advantageous shape of the collar 326, when the flange 310 is in the second position, it is possible, by simple pressure on the flange 310 or on the second part, to replace the flange 310 in the first position. The movement of the flange 310 from the second position to the first position is facilitated by these shapes, the retaining member 312 sliding effortlessly on the blank of the collar until it fits into the groove 325.

The pin 320 may also comprise at least one axial rib 327 extending axially along the body 322.

Advantageously, the axial rib 327 has a first end and a second end. As can be seen, in particular, in FIG. 2A, the first end is in contact with the head of the pin, in order to reinforce the strength of the pin 320. The second end is located opposite the foot 321, so that the second end is in abutment against the female element 200 when the male element 300 is held against the female element 200, as shown in FIGS. 4B and 5B.

Preferably, the retaining member 312 comprises at least two flexible tabs 314 separated from one another by a radial width to receive the axial rib 327 and to guide the axial displacement of the flange 310 on the pin 320 while preventing its axial rotation.

In a particularly advantageously configuration, the pin 320 comprises three axial ribs 327 uniformly distributed around the body 322, and the retaining member 312 comprises three flexible tabs 314 separated from one another by a radial width to respectively receive the axial ribs 327.

Second Embodiment of the Male Element

A second embodiment of a male element 300 according to the present disclosure is shown in FIGS. 1B, 2B, 6A, 6B, 7A, and 7B.

In this embodiment, the body 322 of the pin 320 has a second groove 328, located between the first groove 325 described thus far and the head 323 of the pin 320.

The retaining member 312 is then also configured to engage resiliently in the second groove 328 and to hold the flange 310 on the pin 320 in the second position, as shown in FIGS. 7A and 7B.

Thus, when the flange 310 is in the second position, the holding of the flange 310 on the pin 320 is guaranteed both by the abutment of the rib 313 against the head 323 of the pin 320 and by the resilient engagement of the retaining member 312 in the second groove 328.

Therefore, the pull-out force is distributed between the points of contact between the assembly members 324, 230, between the rib 313 and the head 323 and between the retaining member 312 and the second groove 328, increasing the strength of the attachment device 100 in the event of impact.

In this embodiment, the pin 320 may also comprise at least one axial rib 327, or even several axial ribs, for example, four axial ribs, similar to those described in the first embodiment and having the same advantages.

In order to further enhance the stability of the attachment of the male element 300 to the female element 200, the pin 320 may also comprise a base 329 intended to abut against the female element 200 when the male element 300 is held in the female element 200.

Whatever the embodiment of the male element 300, the various elements of the attachment device 100, namely the female element 200, the flange 310 and the pin 320, can be produced completely by molding plastic material or by plastic injection. These elements could also be made by adding plastic in a 3D printer. Such an attachment device thus has the advantage of being able to be manufactured at low cost.

Of course, the disclosure is not limited to the embodiments described and it is possible to add variants without departing from the scope of the disclosure as defined by the claims.

Thus, the male element 300 could quite well be attached to the inner door wall while the female element 200 could receive the trim panel.

The invention claimed is:

1. A male element of a device for attaching a first part to a second part, the male element comprising:
   a flange for retaining the second part; and
   a pin having a foot, a body and a head, the pin being configured to be axially inserted by the foot into a cavity of a female element attached to the first part, the foot including a male assembly member configured to axially hold the pin in the female element, the body having a groove; wherein the flange of the male element includes:
   an axial opening for receiving the pin and enabling the flange to be moved axially on the pin from a first position to a second position in response to a pull-out force applied to the first or second part;

a retaining member configured to engage resiliently in the groove and to hold the flange on the pin in the first position; and a radial rib inside the opening, the radial rib abutting against the head of the pin when the flange is in the second position.

2. The male element of claim 1, wherein the retaining member comprises at least one flexible tab.

3. The male element of claim 2, wherein the at least one flexible tab has a lug configured to resiliently engage in the groove when the flange is in the first position.

4. The male element of claim 3, wherein the body includes a collar in which the groove is formed.

5. The male element of claim 4, wherein a blank of the collar located opposite the head of the pin has a chamfered shape to facilitate movement of the retaining member from the second position to the first position.

6. The male element of claim 3, wherein the body has a second groove located between the groove and the head.

7. The male element of claim 6, wherein the retaining member is also configured to engage resiliently in the second groove and hold the flange on the pin in the second position.

8. The male element of claim 7, wherein the pin comprises a base configured to abut against the female element when the male element is held in the female element.

9. The male element of claim 6, wherein the pin comprises a base configured to abut against the female element when the male element is held in the female element.

10. The male element of claim 2, wherein the pin comprises at least one axial rib, and wherein the retaining member comprises at least two flexible tabs separated from one another by a radial width to receive the at least one axial rib and to guide axial displacement of the flange on the pin and prevent axial rotation of the flange.

11. The male element of claim 10, wherein the pin comprises three axial ribs uniformly distributed around the body and in which the retaining member comprises three flexible tabs separated from one another by a radial width to respectively receive the axial ribs.

12. The male element of claim 1, wherein the pin comprises at least one axial rib extending axially along the body.

13. The male element of claim 12, wherein the at least one axial rib has a first end and a second end, the first end being in contact with the head of the pin, the second end being opposite the foot so that the second end abuts against the female element when the male element is held in the female element.

14. The male element of claim 1, wherein the flange comprises a compression collar configured to be in contact with the female element when the flange is in the first position.

15. An attachment device for attaching a first part to a second part, comprising:

a male element according to claim 1; and a female element intended to be attached to the first part, the female element having an axial cavity and a female assembly member, the female assembly member being configured to mate with the male assembly member.

16. The male element of claim 1, wherein the body includes a collar in which the groove is formed.

17. The male element of claim 16, wherein a blank of the collar located opposite the head of the pin has a chamfered shape to facilitate movement of the retaining member from the second position to the first position.

18. The male element of claim 1, wherein the body has a second groove located between the groove and the head.

19. The male element of claim 18, wherein the retaining member is also configured to engage resiliently in the second groove and hold the flange on the pin in the second position.

20. A method of attaching an inner metal sheet and an inner trim panel of a motor vehicle door to one another, comprising:

securing a male element to a first part comprising one of the inner metal sheet and the inner trim panel, the male element comprising:

a flange for retaining a second part comprising the other of the inner metal sheet and the inner trim panel; and a pin having a foot, a body and a head, the pin being configured to be axially inserted by the foot into a cavity of a female element attached to the first part, the foot including a male assembly member configured to axially hold the pin in the female element, the body having a groove;

wherein the flange of the male element includes:

an axial opening for receiving the pin and enabling the flange to be moved axially on the pin from a first position to a second position in response to a pull-out force applied to the first or second part;

a retaining member configured to engage resiliently in the groove and to hold the flange on the pin in the first position; and a radial rib inside the opening, the radial rib abutting against the head of the pin when the flange is in the second position;

securing a female element to the other of the inner metal sheet and the inner trim panel, the female element having an axial cavity and a female assembly member, the female assembly member being configured to mate with the male assembly member; and securing the male element to the female element.

* * * * *